United States Patent [19]
Kadowaki

[11] Patent Number: 5,918,253
[45] Date of Patent: Jun. 29, 1999

[54] MEMORY ADDRESS GENERATOR

[75] Inventor: Yukio Kadowaki, Nara-ken, Japan

[73] Assignee: Ricoh Company, Ltd., Tokyo, Japan

[21] Appl. No.: 08/904,045

[22] Filed: Jul. 31, 1997

Related U.S. Application Data

[63] Continuation of application No. 08/371,104, Jan. 11, 1995, abandoned.

[30] Foreign Application Priority Data

Jan. 28, 1994 [JP] Japan .................................. 6-008110

[51] Int. Cl.$^6$ ...................................................... G06F 12/06
[52] U.S. Cl. .............................. 711/220; 711/5; 711/213; 711/217; 711/218
[58] Field of Search ..................................... 711/217, 219, 711/220, 212, 5, 203, 213, 218

[56] References Cited

U.S. PATENT DOCUMENTS 4,935,867  6/1990  Wang et al. .............................. 711/217

*Primary Examiner*—Eddie P. Chan
*Assistant Examiner*—T. V. Nguyen
*Attorney, Agent, or Firm*—Cooper & Dunham LLP

[57] ABSTRACT

An address generator has a designating value storing section for storing a designating value for designating each of register sections of an offset register into an address register. The address generator also has a designating value storing section for storing a designating value for designating each of register sections of a modulo register into the address register. Each of the register sections of the offset register and each of the register sections of the modulo register are automatically designated by designating the address generator. In this address generator, a degree of freedom of addressing can be increased while an increase in hardware scale is avoided as much as possible.

13 Claims, 4 Drawing Sheets

MEMORY ADDRESS GENERATOR

This is a continuation of application Ser. No. 08/371,104 filed Jan. 11, 1995 now abandoned.

BACKGROUND OF THE INVENTION

1. Field of the Invention

The present invention relates to an address generator which can be used to supply sound data to a digital filter used in sound processings of ADPCM, ATRAC, PACS, MREGI, II, etc.

2. Description of the Related Art

Filter processing using a finite impulse response (FIR) filter, etc. is performed in processing of a digital sound. A digital signal processor (DSP) supplies sound data from a memory to this digital filter.

The digital signal processor (DSP) is set to execute many processings in a limited instruction field. Therefore, a horizontal coding system for executing one or more commands at a high speed by one instruction is used. The horizontal coding system is a method for describing one or more commands by one instruction field. In contrast to this horizontal coding system, there is a vertical coding system used in a complex instruction set computer (CISC). This vertical coding system is a method for describing one command by using a plurality of instructions.

In the vertical coding system, it is possible to use a direct address for directly describing an address value in addressing of a memory. However, a width of the instruction field is determined in the horizontal coding system so that no address value can be directly designated. When the address value of a memory is stored to a register in advance and the memory is accessed, indirect addressing for designating a register value indicative of the stored address is used.

For example, when a memory having 64 k bits is accessed, address values of 16 bits must be allocated into instructions in the case of direct addresses. In contrast to this, in the case of the indirect addressing, eight registers of 16 bits are prepared and addresses are stored into these registers. An address required for a memory accessing operation is take out of a register by designating this register. In this indirect addressing, only three address designating bits are required for instructions. Thus, an allocating amount of the memory addressing of the instruction field is reduced as much as possible in the digital signal processor (DSP) using the horizontal coding system.

In the case of the register indirect addressing, an address value within a register must be updated after the indirect addressing is performed. As a technique often used at this time, there is a post incremental technique in which the address value within the register is incremented by +1 after the addressing. There is also a post decremental technique in which the address value within the register is decremented by −1 after the addressing. Further, there is a post incremental or decremental technique with an offset value in which a certain constant value is added or subtracted from the address value within the register. In the case of the post incremental technique or the post decremental technique, an incremental or decremental value is determined so that it is not necessary to designate an offset value. In contrast to this, in the case of the post incremental or decremental technique with an offset value (as addressing with an offset value), the offset value must be provided by instructions.

The same bit allocation as an address is also required for the offset value so that no offset value can be directly designated in the horizontal coding system. Therefore, it is considered to use a method in which this offset value is also stored to the register and is designated by indirect designation of the register. However, a using frequency of such addressing with the offset value is low. Therefore, no bits are normally allocated to the offset addressing as much as possible.

FIG. 1 is a circuit diagram showing one example of an address generator in a general digital signal processor (DSP). In this address generator, an offset register is fixedly arranged and the same register value is used as an offset value at any time when addressing with an offset is performed. Namely, as shown in FIG. 1, this circuit has eight auxiliary registers AR0 to AR7 and one register such as AR0 among these auxiliary registers is used as an offset register. When the addressing with an offset is performed, a value of the register AR0 is used at any time.

FIG. 2 is a circuit diagram showing another example of the address generator in the general digital signal processor (DSP). In this address generator, one offset register is allocated to one address register so that offset register designation is omitted. Namely, as shown in FIG. 2, this circuit has eight address registers R0 to R7, eight offset registers N0 to N7 and eight modulo registers M0 to M7. One offset register and one modulo register are allocated to each of the address registers. Accordingly, when one address register is selected, the offset register and the modulo register corresponding to this address register are automatically selected and used in addressing.

The digital signal processor (DSP) has many applications for repeatedly accessing a certain memory region within a memory. For example, modulo addressing is used as one of these applications. In this modulo addressing, when a filter calculation is made by using sound data stored to the memory, starting and ending addresses in the memory region are provided to a register. When an updated address value is greater than the ending address, the next address is returned to the starting address so that the addressing is repeatedly performed within the same memory region.

The starting and ending addresses as modulo values are normally designated by indirect designation of a register. In the general digital signal processor (DSP), one modulo register is fixedly provided to save an instruction field and a value of this modulo register is used at any time at a modulo addressing time.

In the address generator shown in FIG. 2, when one address register is selected, a modulo register corresponding to this address register is automatically selected and used in addressing.

However, a value of the register AR0 is used at any time in a general structure of the address generator shown in FIG. 1 when the addressing with an offset is performed. Accordingly, only one offset value can be set in this general structure. In a general structure of the address generator shown in FIG. 2, an offset register and a modulo register correspond to each of the eight address registers. Accordingly, a degree of freedom of the addressing is increased, but the number of offset registers and modulo registers is increased as the number of address registers is increased. Therefore, a hardware scale of this address generator is increased.

Further, in a structure for fixedly providing one modulo register in the modulo addressing, a degree of freedom of the modulo addressing is reduced. On the other hand, hardware of the general structure of the address generator shown in FIG. 2 is increased in size.

SUMMARY OF THE INVENTION

It is therefore an object of the present invention to provide an address generator for increasing a degree of freedom of addressing while an increase in hardware scale is avoided as much as possible.

In accordance with a first construction of the present invention, the above object can be achieved by an address generator in which an address value for accessing a memory is stored to an address register;

the memory is accessed by obtaining the address value by designating the address register;

an updated address candidate value is obtained by subtracting or adding an address offset value stored to an offset register to the address value; and the updated address candidate value is stored to the address register;

the address generator comprising a designating value storing section for storing a designating value for designating the offset register into the address register; and the address generator being constructed such that the offset register is automatically designated by designating the address register.

In accordance with a second construction of the present invention, the above object can be also achieved by an address generator in which an address value for accessing a memory is stored to an address register;

the memory is accessed by obtaining the address value by designating the address register; and a starting address value stored to a modulo register is stored to the address register when an updated address candidate value exceeds a final address value stored to the modulo register;

the address generator comprising a designating value storing section for storing a designating value for designating the modulo register into the address register; and the address generator being constructed such that the modulo register is automatically designated by designating the address register.

In accordance with a third construction of the present invention, the above object can be also achieved by an address generator in which an address value for accessing a memory is stored to an address register;

the memory is accessed by obtaining the address value by designating the address register;

an updated address candidate value is obtained by subtracting or adding an address offset value stored to an offset register, a value +1 or a value −1 to the address value;

the updated address candidate value is stored to the address register when no updated address candidate value exceeds a final address value stored to a modulo register; and a starting address value stored to the modulo register is stored to the address register when the updated address candidate value exceeds the final address value;

the address generator comprising:

a designating value storing section for storing designating values for designating the offset register and the modulo register into the address register; and the address generator being constructed such that the offset register and the modulo register are automatically designated by designating the address register.

In accordance with a fourth construction of the present invention, the offset register and/or the modulo register is automatically designated by a designating value outputted from the designating value storing section by designating the address register, and values stored to the registers are updated by this designation.

In accordance with the above first construction, a plurality of offset values are prepared by the offset register when addressing with an offset is performed. Accordingly, a degree of freedom of this addressing is increased. Each of registers arranged in the offset register is designated by a register designating value automatically outputted by designating the address register. These registers in the offset register have no one-to-one corresponding relation with plural address registers. Accordingly, the number of registers arranged in the offset register can be set to be smaller than the number of address registers so that a hardware scale of the address generator can be reduced.

In accordance with the above second construction, a plurality of modulo values are prepared by the modulo register when modulo addressing is performed. Accordingly, a degree of freedom of this addressing is increased. Each of registers arranged in the modulo register is designated by a register designating value automatically outputted by designating the address register. These registers in the modulo register have no one-to-one corresponding relation with plural address registers. Accordingly, the number of registers arranged in the modulo register can be set to be smaller than the number of address registers so that a hardware scale of the address generator can be reduced.

In accordance with the above third construction, both the offset register and the modulo register are automatically designated by designating the address register so that both the above operations of the address generator in the first and second constructions can be simultaneously performed.

In accordance with the above fourth construction, the offset register and/or the modulo register is automatically designated by designating the address register. A value stored to this designated register is updated. Accordingly, bit allocation for designating each of the registers can be omitted even when the stored value is updated. Therefore, it is possible to effectively use an instruction field.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an address generator in the present invention will next be described in detail with reference to the accompanying drawings.

Figure 1:
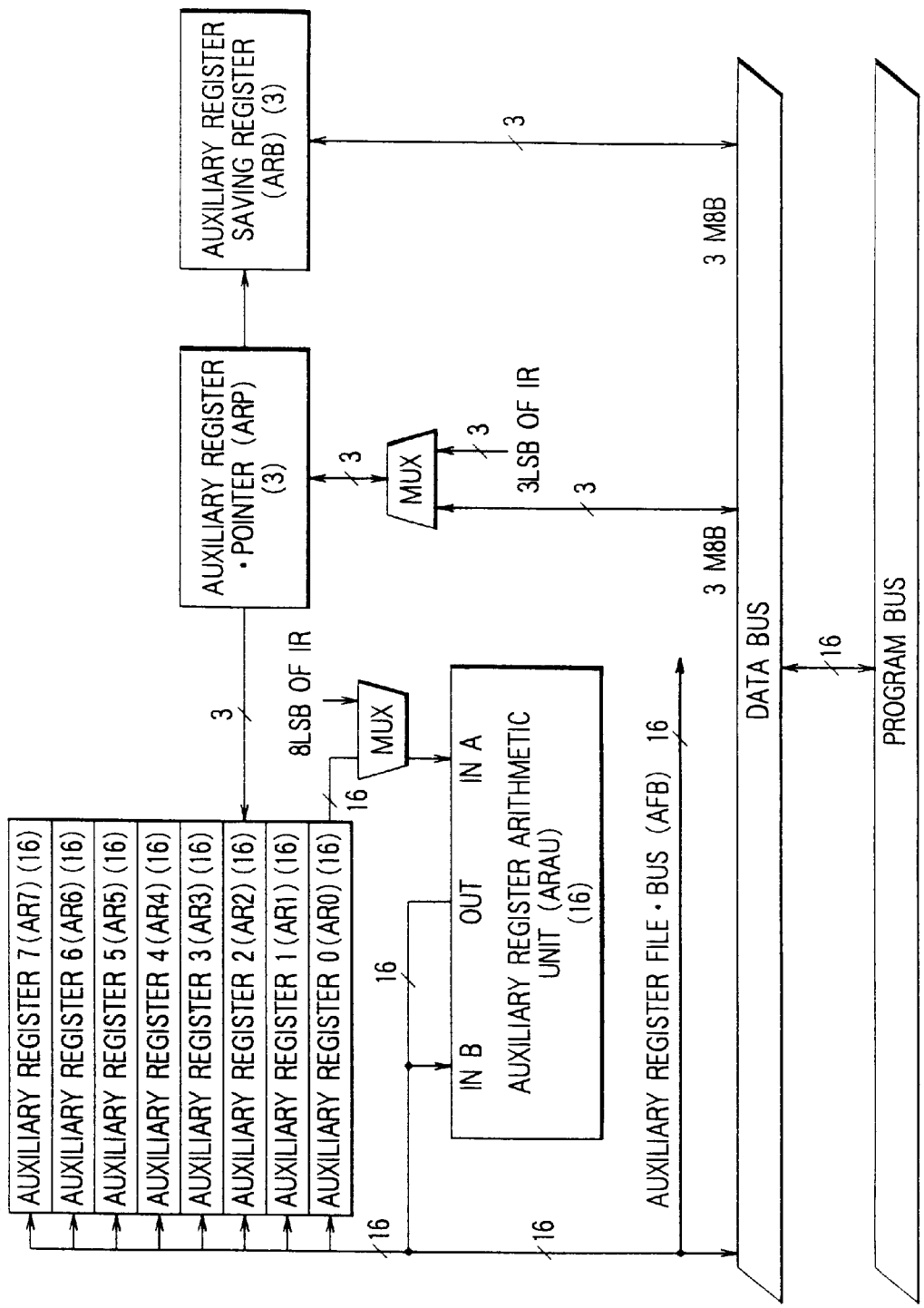
FIG. 1 is a block diagram showing one example of a general address generator.
Figure 2:
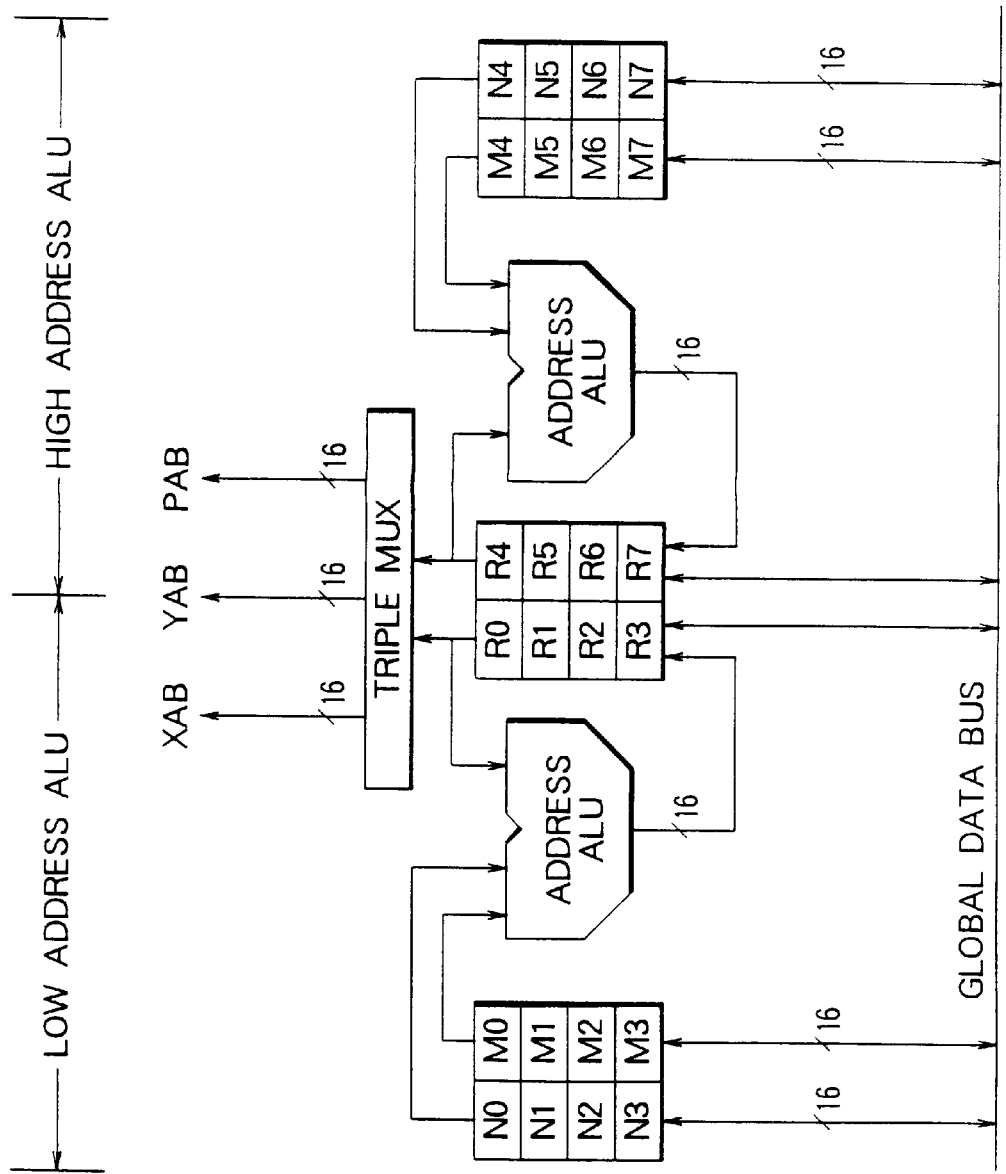
FIG. 2 is a block diagram showing another example of the general address generator.
Figure 3:
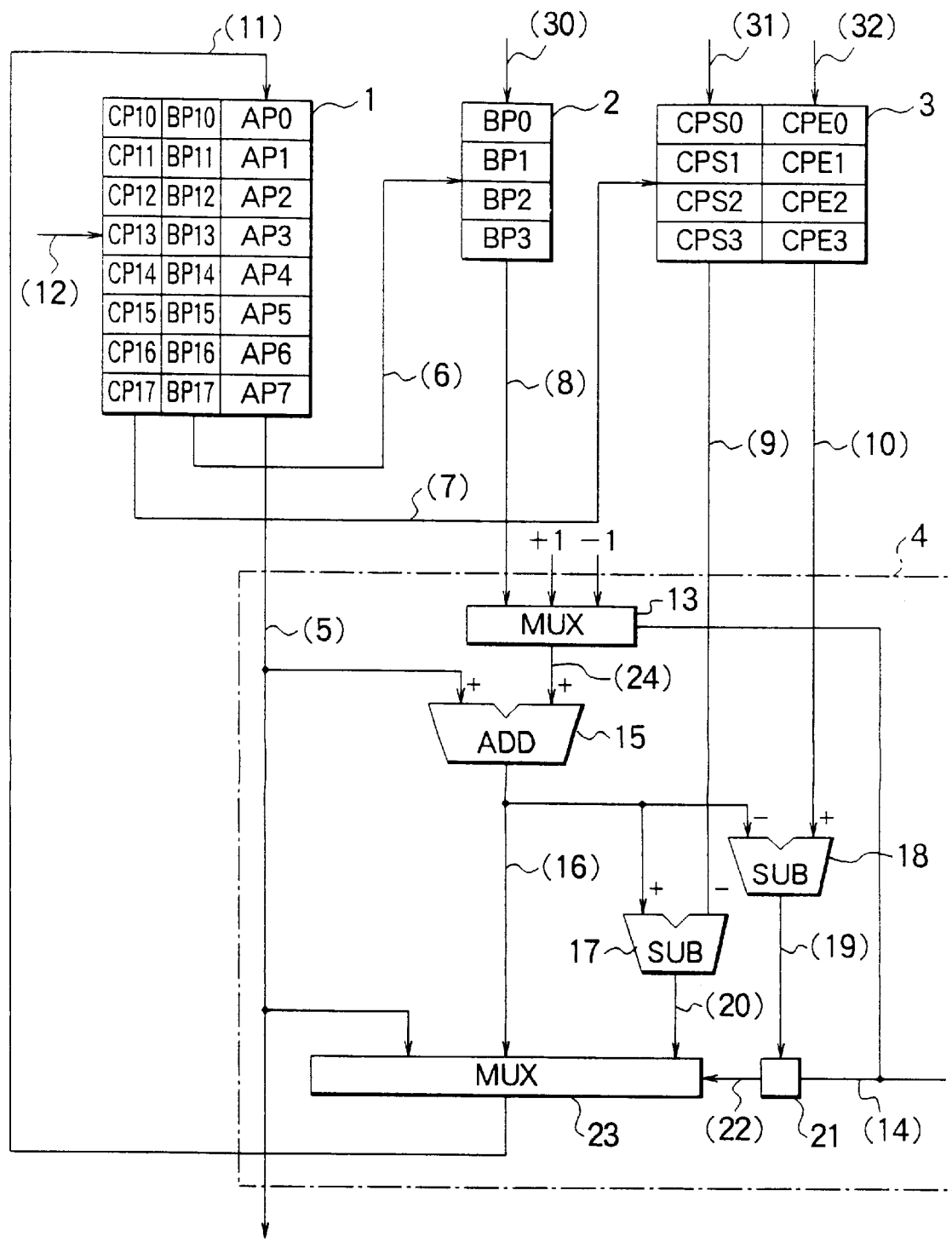
FIG. 3 is a block diagram showing an address generator of the present invention.

FIG. 3 is a block diagram showing an address generator in the present invention. In FIG. 3, reference numerals 1, 2, 3 and 4 respectively designate an address pointer, an offset register, a modulo register and an address calculating section.

The address pointer 1 has eight address registers AP (AP0 to AP7). The address register AP0 has a designating value storing section BPI0 for storing a designating value for designating the offset register 2. The address register AP0 also has a designating value storing section CPI0 for storing a designating value for designating the modulo register 3. Similarly, each of the other address registers AP1 to AP7 has a designating value storing section BPI (BPI1 to BPI7) for storing a designating value for designating the offset register 2, and has a designating value storing section CPI (CPI1 to CPI7) for storing a designating value for designating the modulo register 3.

The address register AP is designated by a value obtained by decoding an address pointer designating signal 12 from instructions. Since the eight address registers are arranged, the address pointer designating signal 12 is constructed by a 3-bit signal.

The offset register 2 has four register sections BP (BP0 to BP3) to which offset values are respectively stored. When the above address register AP is designated, each of these four register sections BP (BP0 to BP3) is designated by an offset register designating value (6) stored to the designating value storing section BPI in this designated address register AP.

The modulo register 3 has four starting register sections CPS (CPS0 to CPS3) to which starting address values are respectively stored. The modulo register 3 also has four ending register sections CPE (CPE0 to CPE3) to which ending address values are respectively stored. The starting register section CPS0 and the ending register section CPE0 constitute a set. Similarly, each of the starting register sections CPS1 to CPS3 and each of the ending register sections CPE1 to CPE3 constitute a set. When the above address register AP is designated, each of the register sections CPS and CPE is designated by a modulo register designating value (7) stored to the designating value storing section CPI in this designated address register AP. In this embodiment, a starting address corresponding value is used as a starting address. This starting address corresponding value is a relative value showing a range of modulo addressing performed with respect to a modulo ending address value.

The above address calculating section 4 is constructed by a first multiplexer 13, an adder 15, a first subtracter 17, a second subtracter 18, a commanding means 21 and a second multiplexer 23.

An offset value (8) of a designated register section BP in the offset register 2 and values +1 and −1 are inputted to the first multiplexer 13. The first multiplexer 13 selects one of the offset value (8) and values +1 and −1 by an instruction signal 14, and outputs the selected one.

An output (24) of the first multiplexer 13 and a present address value (5) of the designated address register AP in the address pointer 1 are inputted to the adder 15. The adder 15 adds the output (24) and the present address value (5) to each other. The adder 15 outputs an added value as an updated address candidate value (16) to the first subtracter 17, the second subtracter 18 and the second multiplexer 23.

A starting address corresponding value (9) of a designated starting register section CPS in the modulo register 3 is inputted to the first subtracter 17. The first subtracter 17 subtracts this starting address corresponding value (9) from the above updated address candidate value (16) of the adder 15 and outputs a subtracted value to the second multiplexer 23. The subtracted value obtained by this subtraction is set to a starting address value (20) showing an actual starting address as described later.

An ending address value (10) of a designated ending register section CPE in the modulo register 3 is inputted to the second subtracter 18. The second subtracter 18 subtracts the above updated address candidate value (16) of the adder 15 from this ending address value (10) and outputs a subtracted value (19) toward the second multiplexer 23.

The instruction signal (14) and the output value (19) of the second subtracter 18 are inputted to the commanding means 21. The commanding means 21 outputs a switching command (22) to the second multiplexer 23 on the basis of positive and negative results of the output value (19) and contents of the instruction signal (14).

The address value (5) of the address register AP, the above updated address candidate value (16) of the adder 15, and the starting address value (20) of the first subtracter 17 are inputted to the second multiplexer 23. The second multiplexer 23 selects and outputs one of the address value (5), the updated address candidate value (16) and the starting address value (20) to the address register AP of the address pointer 1 as an updated address value (11). This selection is made on the basis of the switching command (22). Namely, if the output value (19) is positive, the present address value (5) or the updated address candidate value (16) is selected on the basis of the instruction signal (14). In contrast to this, if the output value (19) is negative, the starting address value (20) is selected.

After the address value is outputted from the address register AP, the starting address value (11) from the second multiplexer 23 is stored to this address register AP.

A normal address generating operation based on the above construction except for a modulo operation will next be explained.

An address register AP selected on the basis of an address pointer designating signal (12) outputs an address value (5) stored to this address register AP. This address value (5) is stored to an unillustrated memory. Simultaneously, designating values (6) and (7) held in designating value storing sections BPI and CPI in this address register AP are outputted therefrom.

A register BP of the offset register 2 is selected by this designating value (6). An offset value (8) held in the selected register section BP is outputted to the first multiplexer 13.

The first multiplexer 13 outputs one of the offset value (8) and values +1 and −1 on the basis of an instruction signal (14). An output value (24) of the first multiplexer 13 is added to the present address value (5) by the adder 15 so that an updated address candidate value (16) is generated. One of this updated address candidate value (16) and the present address value (5) is stored to one of the address registers AP in the address pointer 1.

As mentioned above, a plurality of offset values are prepared by the offset register 2 even when addressing with an offset is performed. Accordingly, it is possible to increase a degree of freedom of this addressing. Each of the register sections BP of the offset register 2 is designated by the designating value (6) from the designating value storing section BPI. These register sections BP0 to BP3 have no one-to-one corresponding relation with the eight address registers AP0 to AP7. The number of register sections BP can be set to be smaller than the number of address registers AP. Accordingly, it is not necessary to arrange eight offset value storing registers when the eight address registers are arranged as in the general address generator. Therefore, a hardware scale of the address generator is reduced.

Modulo addressing based on the above construction will next be explained.

An address register AP selected on the basis of an address pointer designating signal (12) outputs an address value (5) stored to this address register AP. This address value (5) is stored to an unillustrated memory. Simultaneously, designating values (6) and (7) held in designating value storing sections BPI and CPI in this address register AP are outputted therefrom.

Each of register sections CPS and CPE in the modulo register 3 is selected by the above designating value (7). A starting address corresponding value (9) held in the selected register section CPS is outputted to the first subtracter 17. An ending address value (10) held in the selected register section CPE is outputted to the second subtracter 18.

The second subtracter 18 compares an updated address candidate value (16) with the ending address value (10). When the updated address candidate value (16) exceeds the ending address value (10), the second multiplexer 23 selects a starting address value (20) from the first subtracter 17 by the commanding means 21. This starting address value (20) is outputted to the address register AP as an updated address value (11).

A value obtained by subtracting the starting address corresponding value (9) from the updated address candidate value (16) is set to a starting address value showing an actual starting address. This setting operation will next be explained with reference to FIG. 4.

Figure 4:
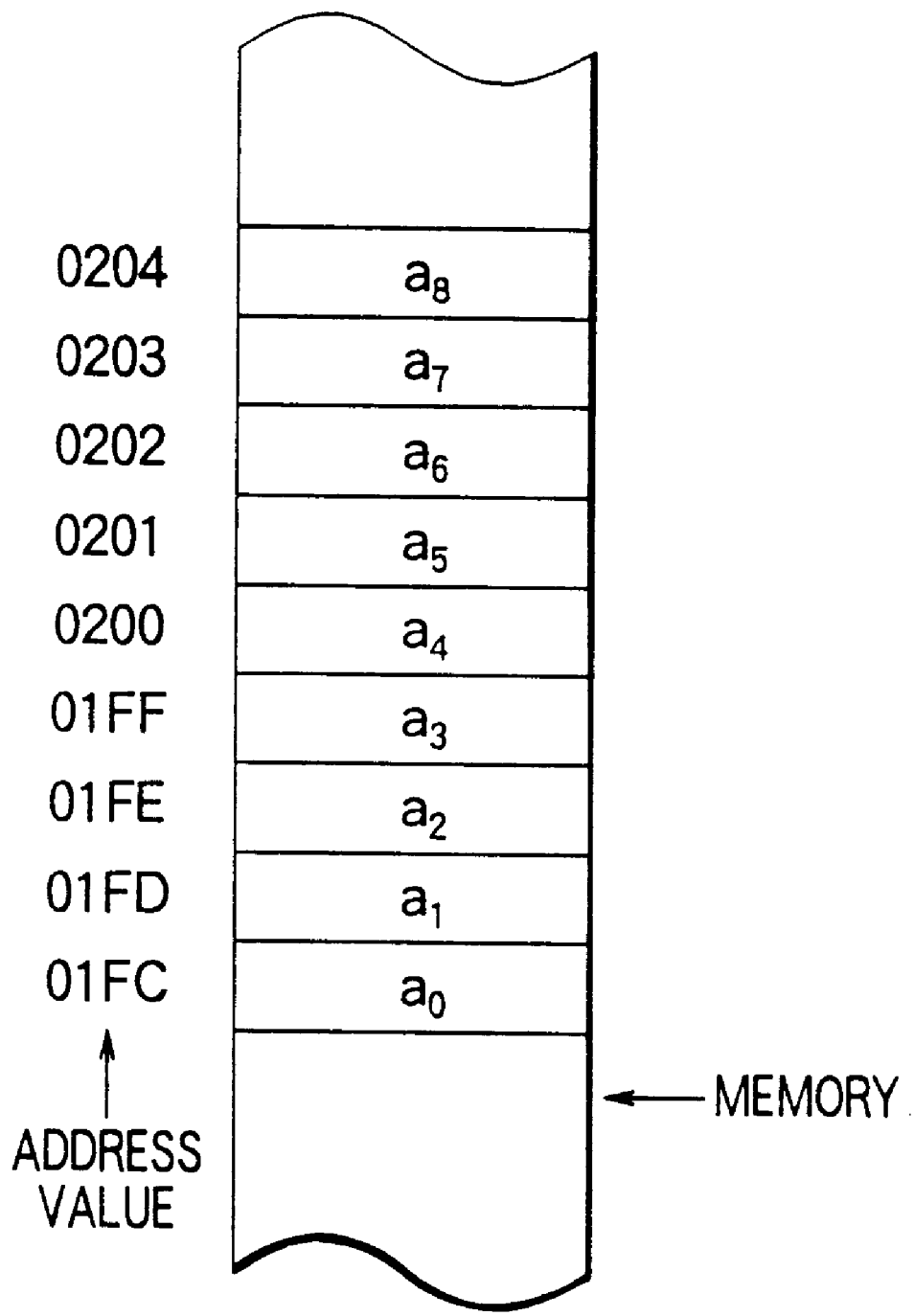
FIG. 4 is an explanatory view showing a data storing state of a memory to explain modulo addressing.

FIG. 4 shows a case in which coefficient data $a_0$ to $a_8$ are arranged between addresses 01FCh to 0204h with a memory. In the modulo addressing, the coefficient data are switched while an address value is post-incremented by +1 from address 01FCh. In the case of FIG. 4, a modulo address width is equal to 0009h so that 0009h is stored as a starting address corresponding value. In such a situation, the first subtracter 17 subtracts 0009h from an updated address candidate value 0205h obtained by post-incrementing the final address value 0204h by +1. Thus, a starting address value 01FCh is obtained as an output value (20) of the first subtracter 17.

The starting address value can be stored to the starting register section CPS of the modulo register 3 by separately subtracting 0009h from the updated address candidate value 0205h. The post-incremental operation with respect to +1 is performed in the example of FIG. 4. However, similar operations and effects can be also obtained when a post-incremental operation with respect to an offset value is performed.

As mentioned above, it is not necessary to arrange eight modulo value storing registers when the modulo addressing is performed and eight address registers are arranged as in the general address generator. Accordingly, a hardware scale of the address generator can be reduced.

The next description relates to an updating operation of a value stored to a register section BP in the offset register 2 and an updating operation of values stored to register sections CPS and CPE in the modulo register 3.

Similar to the above-mentioned case, when an address register AP is selected, designating values (6) and (7) held in designating value storing sections BPI and CPI in this address register AP are simultaneously outputted therefrom. Thus, the register sections BP, CPS and CPE are designated. In this designation, an operating state of each of these register sections is set to a writing state, and updated storing values (30), (31) and (32) are respectively outputted from unillustrated data output sections to these register sections BP, CPS and CPE. Thus, values stored to the register sections BP, CPS and CPE are respectively updated.

Accordingly, bit allocation for designating each of the register sections can be omitted even when the stored values are updated. Therefore, it is possible to effectively use an instruction field.

As mentioned above, in accordance with the present invention, a degree of freedom of addressing can be increased while an increase in hardware scale of the address generator is avoided as much as possible. Further, bit allocation for designating each of register sections can be omitted even when values stored to the register sections are updated. Therefore, it is possible to effectively use an instruction field.

Many widely different embodiments of the present invention may be constructed without departing from the spirit and scope of the present invention. It should be understood that the present invention is not limited to the specific embodiments described in the specification, except as defined in the appended claims.

What is claimed is:

1. An address generator in which an address value for accessing a memory is stored in an address register:
   the memory is accessed by obtaining said address value by addressing the address register;
   an updated address candidate value is obtained by subtracting or adding an address offset value stored in an offset register to said address value; and
   the updated address candidate value is stored in the address register;
   the address generator comprising a designating value storing section in said address register for storing a designating value for indirectly addressing said offset register; and
   the address generator being constructed such that the offset register is indirectly addressed by addressing the address register.

2. An address generator as claimed in claim 1, wherein the offset register is automatically designated by the designating value outputted from the designating value storing section by designating the address register; and
   values stored to the registers are updated by this designation.

3. An address generator in which an address value for accessing a memory is stored in an address register;
   the memory is accessed by obtaining said address value by addressing the address register; and
   a starting address value stored in a modulo register is stored in the address register when an updated address candidate value exceeds a final address value stored in the modulo register;
   the address generator comprising a designating value storing section in said address register for storing a designating value for indirectly addressing said modulo register; and
   the address generator being constructed such that the modulo register is indirectly addressed by addressing the address register.

4. An address generator as claimed in claim 3, wherein the modulo register is automatically designated by the designating value outputted from the designating value storing section by designating the address register; and
   values stored to the registers are updated by this designation.

5. An address generator in which an address value for accessing a memory is stored in an address register;
   the memory is accessed by obtaining said address value by addressing the address register;

an updated address candidate value is obtained by subtracting or adding an address offset value stored in an offset register, a value +1 or a value −1 to said address value;

said updated address candidate value is stored in the address register when no updated address candidate value exceeds a fmal address value stored in the modulo register; and a starting address value stored in the modulo register is stored in the address register when the updated address candidate value exceeds the final address value;

the address generator comprising:

a designating value storing section in said address register for storing designating values for indirectly addressing said offset register and said modulo register;

the address generator being constructed such that the offset register and the modulo register are indirectly addressed by addressing the address register.

6. An address generator as claimed in claim 5, wherein the offset register and/or the modulo register is automatically designated by a designating value outputted from the designating value storing section by designating the address register; and values stored to the registers are updated by this designation.

7. An address generator for indirectly addressing a memory, said address generator comprising an address pointer including a plurality of address registers storing address values, each address register including a corresponding offset register designating value storing section for indirectly addressing one of a plurality of offset values stored in an offset register and a modulo register designating value storing section for indirectly addressing one of a plurality of modulo values stored in a modulo register, an address register being addressed and the offset and module registers being indirectly addressed by decoding an address pointer designating signal such that a value in the offset register designating value storing section corresponding to the addressed address register is used to access an offset value and a value in the modulo register designating value storing section corresponding to the addressed address register is used to access the modulo register.

8. An address generator as recited in claim 7, further comprising an address calculating section for receiving the address values, offset values and modulo values and for calculating an address accordingly.

9. An address generator as recited in claim 8, said address calculating section comprising an adder for adding an address value from the address register and an offset value.

10. An address generator as recited in claim 9, wherein the offset value is selected from one of a value addressed from the offset register, a value of +1 and a value of −1.

11. An address generator as recited in claim 9, wherein the modulo register stores corresponding start address values and end address values.

12. An address generator as recited in claim 11, further comprising a first subtractor for subtracting a start address value from an output from the adder.

13. An address generator as recited in claim 12, further comprising a second subtractor for subtracting the output from the adder from the end address value.

* * * * *